(12) United States Patent
Oswald

(10) Patent No.: US 8,060,884 B2
(45) Date of Patent: Nov. 15, 2011

(54) DETERMINISTIC TASK SCHEDULING IN A COMPUTING DEVICE

(75) Inventor: Tommy Lee Oswald, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 1161 days.

(21) Appl. No.: 11/825,910

(22) Filed: Jul. 10, 2007

(65) Prior Publication Data

US 2009/0019445 A1    Jan. 15, 2009

(51) Int. Cl.
G06F 9/46 (2006.01)
(52) U.S. Cl. .......................... 718/104; 718/107
(58) Field of Classification Search .................. 718/100, 718/102, 103, 104, 107
See application file for complete search history.

(56) References Cited

U.S. PATENT DOCUMENTS

| | | | |
|---|---|---|---|
| 5,287,194 A * | 2/1994 | Lobiondo | 358/296 |
| 5,487,170 A | 1/1996 | Bass et al. | 395/732 |
| 6,430,593 B1 | 8/2002 | Lindsley et al. | 718/103 |
| 6,542,940 B1 | 4/2003 | Morrison et al. | 710/22 |
| 6,709,176 B2 * | 3/2004 | Gotoh et al. | 400/61 |
| 6,912,712 B1 | 6/2005 | Myung | 718/101 |
| 7,143,210 B2 * | 11/2006 | Ferlitsch | 710/38 |
| 7,339,687 B2 * | 3/2008 | Ferlitsch | 358/1.13 |
| 7,711,858 B2 * | 5/2010 | Ofer et al. | 710/6 |
| 7,787,138 B2 * | 8/2010 | Lofthus et al. | 358/1.15 |
| 2002/0138558 A1 * | 9/2002 | Ferlitsch | 709/203 |
| 2003/0037091 A1 | 2/2003 | Nishimura et al. | 709/103 |
| 2006/0268317 A1 * | 11/2006 | Lofthus et al. | 358/1.15 |
| 2007/0050669 A1 * | 3/2007 | Ofer et al. | 714/6 |

FOREIGN PATENT DOCUMENTS

JP    4-372022    12/1992

OTHER PUBLICATIONS

Davide Libenzi, SCHED_SOFTRR Linux Scheduler Policy, 2003, 5 pages, <www.xmailserver.org/linux-patches/softrr.html>.

* cited by examiner

*Primary Examiner* — Van Nguyen
(74) *Attorney, Agent, or Firm* — Scot A. Reader

(57) ABSTRACT

A method and system for scheduling tasks in a computing device ensures substantially seamless processing of an active job while preventing starvation of background tasks. In one aspect, a method comprises the steps of statically allocating processor time to a background task class and dynamically allocating processor time to background tasks within the background task class based at least in part on a current count of the background tasks. The background task processor time may equal the background task class processor time divided by the current count. The method may further comprise, in each of successive processing periods, assigning a processor to each of the background tasks for their respective background task processor times and assigning the processor to active job tasks when the processor is not assigned to any of the background tasks. The computing device may be a printing device.

11 Claims, 3 Drawing Sheets

DETERMINISTIC TASK SCHEDULING IN A COMPUTING DEVICE

BACKGROUND OF THE INVENTION

The present invention relates to scheduling of tasks in a computing device, such as a printing device and, more particularly, to allocating processing resources in a computing device to tasks in a manner that ensures substantially seamless processing of an active job while preventing starvation of background tasks.

Conventional operating systems for computing devices, such as printing devices, typically schedule tasks based on strict priority and schedule tasks at the some priority round-robin. Under this scheduling algorithm, background tasks, such as background print spooling tasks, typically receive little processing time because they have a lower priority than active job tasks. If the priority assignment of the background tasks were raised to the same level as the active job tasks (or, conversely, if the priority assignment of the active job tasks were lowered to the some level as the background tasks), the background tasks would receive abundant processing time but would interfere too much with the active job.

Some operating systems used in computing devices have introduced scheduling algorithms that allocate a specified block of processing time to a task upon creation of the task. While these scheduling algorithms can guarantee that a background task will not be starved-out, they suffer from other problems. First, these allocations generally cannot be reduced if the processor becomes oversubscribed. For example, if a second background spooling task is created while a first background spooling task is still pending, these algorithms will generally allocate the same amount of processing time to the second task as to the first, resulting in twice as much processing time being allocated to background spooling and too much interference with an active job. Second, these allocations are generally monolithic in their use of processing time. That is, once a background task starts to run it will claim the processor for the entire duration of the allocated block of processing time. This can lead to a sustained interruption in processing of an active job that is noticeable (e.g. "jerky" execution) and too lengthy from a user's perspective.

SUMMARY OF THE INVENTION

The present invention, in a basic feature, provides a method and system for scheduling tasks in a computing device in a manner that ensures substantially seamless processing of an active job while preventing starvation of background tasks. In some embodiments, the computing device is a printing device and the active job is an active print job.

In one aspect, a method for scheduling tasks in a computing device comprises the steps of statically allocating processor time (P) to a background task class (S) and dynamically allocating processor time (p) to background tasks within the background task class (S) based at least in part on a current count (n) of the background tasks. The background task processor time (p) may equal the background task class processor time (P) divided by the current count (n). The method may further comprise, in each of successive processing periods, assigning a processor to each of the background tasks for their respective background task processor times ($p_{1-n}$) and assigning the processor to active job tasks when the processor is not assigned to any of the background tasks.

In another aspect, a method for scheduling tasks in a computing device comprises the steps of specifying a background task class (S), a processing period (T) and a background task class processor time (P) within the processing period (T), dynamically determining a current count (n) of background tasks within the background task class (S) and dynamically allocating a background task processor time (p) within the processing period (T) to each of the background tasks based at least in part on the background task class processor time (P) and the current count (n). The background task processor time (p) dynamically allocated to each of the background tasks may equal the background task class processor time (P) divided by the current count (n). The method may further comprise, in each of successive processing periods, assigning a processor to each of the background tasks for their respective dynamically allocated background task processor times ($p_{1-n}$) and assigning the processor to active job tasks when the processor is not assigned to any of the background tasks.

In yet another aspect, a method for scheduling tasks within a computing device comprises the steps of determining a background task class (S), a processing period (T) and a background task class processor time (P) within the processing period (T), assigning the highest priority of a scheduler to one or more background tasks within the background task class (S), assigning a processor to the background tasks for the background task class processor time (P) and removing the background tasks from the scheduler for the remainder of the processing period (T). The processor may be assigned to the background tasks round-robin for the background task class processor time (P). The current background tasks may be removed from the scheduler through execution of one or more sleep calls.

The computing device may be a printing device, such as a multifunction printer (MFP). The active job tasks may comprise active print job tasks and the background tasks may comprise background print spooling tasks. The background task class processor time (P) may be determined based at least in part on a print data spooling rate.

These and other aspects of the invention will be better understood by reference to the detailed description of a preferred embodiment taken in conjunction with the drawings briefly described below. Of course, the scope of the invention is defined by the appended claims.

DETAILED DESCRIPTION OF A PREFERRED EMBODIMENT

Figure 1:
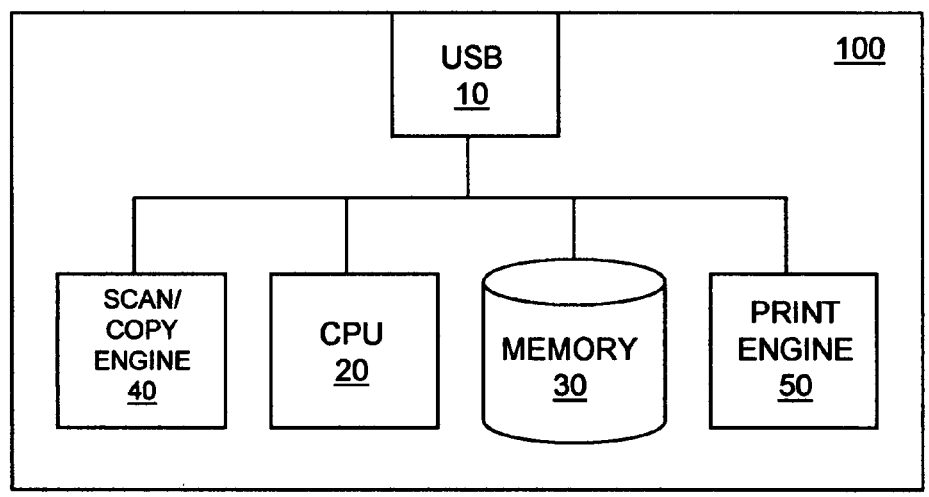
FIG. 1 shows an MFP.

In FIG. 1, a multifunction printer (MFP) 100 is shown. MFP 100 supports multiple functions, such as printing, scanning and copying. MFP 100 has a universal serial bus (USB) port 10 that communicatively couples MFP 100 with a computing device, such as a personal computer, a workstation or a server, via a USB cable. MFP 100 receives commands and print data via USB port 10. Internal to MFP 100, USB port 10 is communicatively coupled with a processor (CPU) 20, a memory 30 a scan/copy engine 40 and a print engine 50. Scan/copy engine 40 includes scanner/copier logic, such as one or more integrated circuits (ICs), and a mechanical section for performing a scanner and copier functions. For example, scan/copy engine 40 may have a line image sensor mounted on a movable carriage for optically scanning a document under the control of a scanner IC and storing the scanned document into memory 30. Print engine 50 includes printer logic, such as one or more ICs, and a mechanical section for performing printer functions. For example, print engine 50 may have a color ink jet head mounted on a movable carriage for printing a document under the control of a printer IC. While in the illustrated embodiments an MFP 100 that supports multiple functions is shown, in other embodiments of the invention a single-function printing device without scanning or copying capabilities may be utilized.

Figure 2:
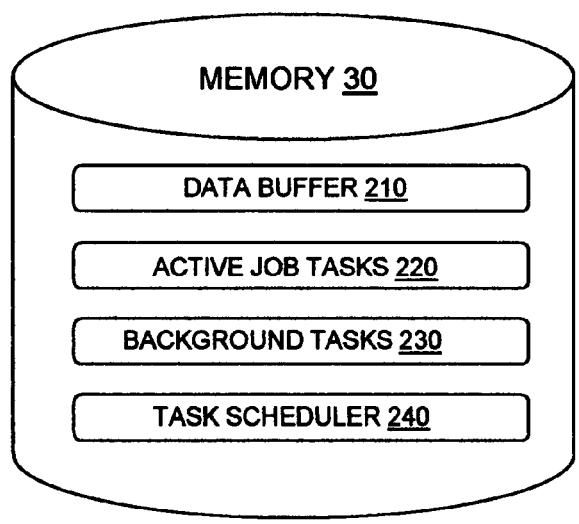
FIG. 2 shows a memory of an MFP in more detail.

Referring to FIG. 2, memory 30 is shown in more detail. Memory 30 includes one or more random access memories (RAM) and one or more read-only memories (ROM). An operating system installed in memory 30 and executed by processor 20 manages operations on MFP 100 by creating, scheduling and performing various tasks. In some embodiments, the operating system is a real-time operating system. Tasks include active job tasks 220 and background tasks 230, all of which are scheduled by a task scheduler 240. Active job tasks 220 are tasks associated with an active job, such as reading of print data for an active print job from a data buffer 210, rasterizing the print data into engine-ready data, and sending the engine-ready data to print engine 50 for printing. Background tasks 230 are tasks that are not associated with an active job, such as background print spooling tasks in which print data for a requested print job received from an input source, such as a personal computer communicatively coupled with MFP 100 via USB port 10, are written into data buffer 210 for subsequent rasterization and transmission to print engine 50 once the requested print job becomes the active job. Naturally, active job tasks 220 and background tasks 230 may include scanning and copying tasks in as well as printing tasks.

Figure 3:
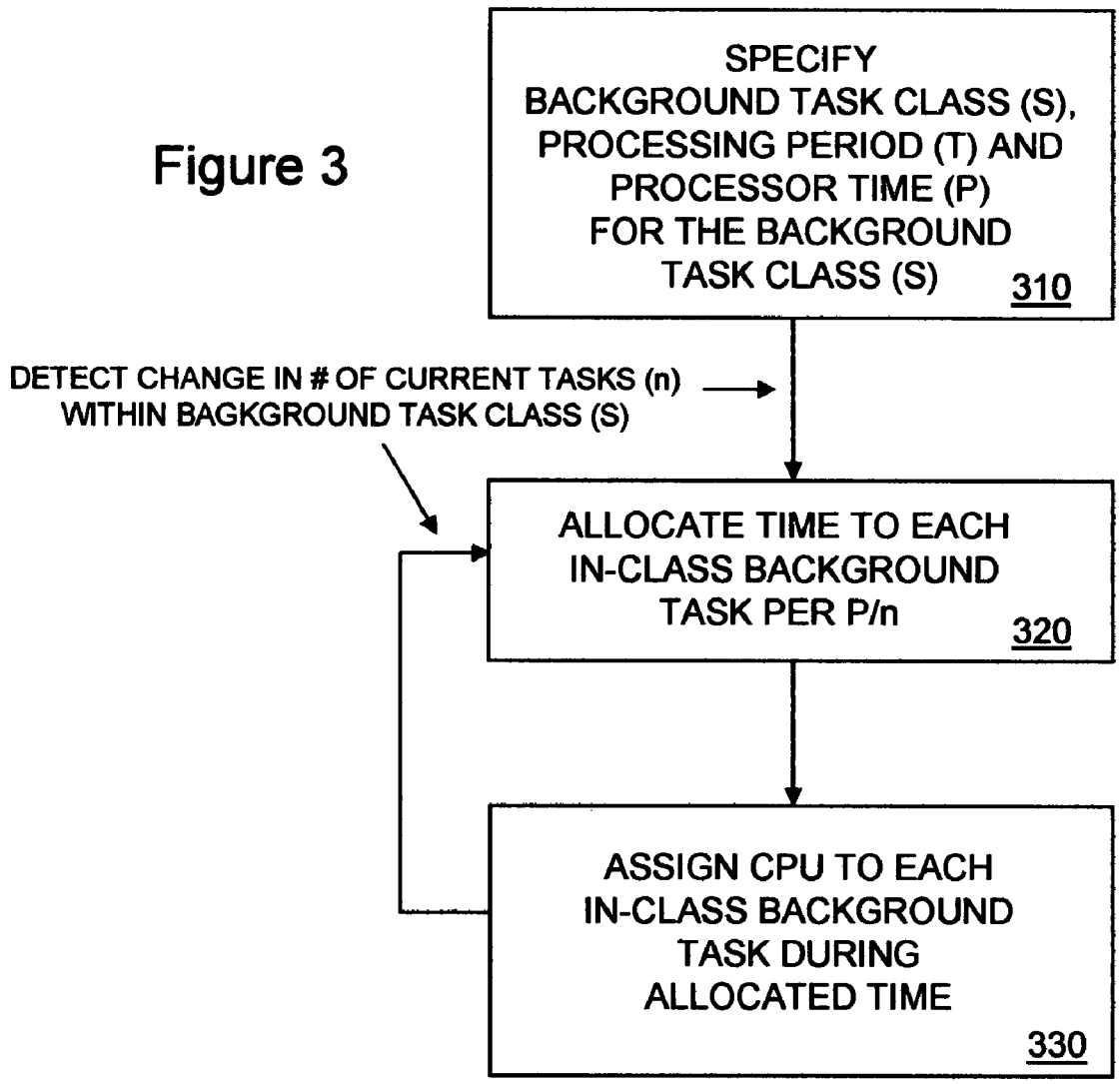
FIG. 3 shows a method for scheduling tasks in an MFP in one embodiment of the invention.

FIG. 3 illustrates a method for scheduling tasks in MFP 100 in one embodiment of the invention. Initially, task scheduler 240 is configured with a background task class (S), a processing period (T) and a processor time (P) for the background task class (S) (310). The background task class (S) is a repository for background tasks 230 that have a specified characteristic. Background tasks 230 having the specified characteristic are assigned to the background task class (S) upon creation. For example, in some embodiments, a background task class is configured for background print spooling and background print spooling tasks are assigned to the class upon creation of the tasks. The background task class (S) is associated with a unique identifier. In some embodiments, multiple background task classes ($S_{1-n}$) are configured and each is associated with a unique identifier.

The processing period (T) is the time length of a repetitive cycle within which processor time is assigned to active job tasks 220 and background tasks 230.

The processor time (P) for the background task class (S) is the aggregate processor time within the processing period (T) that is assigned to background tasks 230 that are within the background task class (S). It will be appreciated that by judiciously configuring the processing period (T) and the processor time (P) for the background task class (S), starvation of background tasks 230 within the background task class (S) may be advantageously avoided without unacceptable disruption of active job processing. For example, if there is a single background task class (S) that needs protection from starvation and active job tasks 220 must receive 75% of the total processor time with a maximum disruption of 15 seconds in order to provide sufficiently seamless performance, the processor time (P) for the background task class (S) may be set to 15 seconds and the processing period (T) may be set to 60 seconds.

In operation, in response to a detected change in the count of current tasks (n) within the background task class (S), task scheduler 240 sets the time allocation for each current task within the background task class (S) to the processor time (P) configured for the background task class (S) divided by the current task count (n) (320). For example, if the processor time (P) configured for the background task class (S) is 15 seconds, when a first task ($s_1$) within the class (S) is created, task scheduler 240 allocates the entire 15 seconds to the first task ($s_1$). Then, when a second task ($s_2$) within the class (S) is created while the first task ($s_1$) is still pending, task scheduler 240 reduces the allocation of the first task ($s_1$) to 7.5 seconds and allocates the remaining 7.5 seconds to the second task ($s_2$). When the first task ($s_1$) is thereafter completed while the second task ($s_2$) is still pending, task scheduler 240 increases the allocation of the second task ($s_2$) to 15 seconds. And so on.

Processor 20 is assigned to each current task within the background task class (S) in accordance with the dynamic time allocations made to current tasks (330).

It will be appreciated that by statically configuring an aggregate time allocation for a background task class (S) and dynamically adjusting the time allocated to each current task within the class (S) based on the number of current tasks (n) within the class (S), all current tasks within the class (S) are guaranteed a variable but non-zero amount of processor time, while active job tasks 220 are guaranteed a fixed amount of processor time.

Naturally, multiple background task classes ($S_{1-n}$) may be configured, each having a static time allocation, wherein the time allocation for each current task within the class is dynamically adjusted based on the number of current tasks within the class.

In some embodiments, the processor time (P) assigned to a background task class (S) is contiguous. That is, within each of successive processing periods, processor 20 is assigned to background tasks within a class (S) for a single block of time of length P. In other embodiments, the processor time (P) assigned to a background task class (S) is intermittent. That is, within each of successive processing periods, processor 20 is assigned to background tasks within a class (S) during multiple non-contiguous blocks of time whose sum is P.

Figure 4:
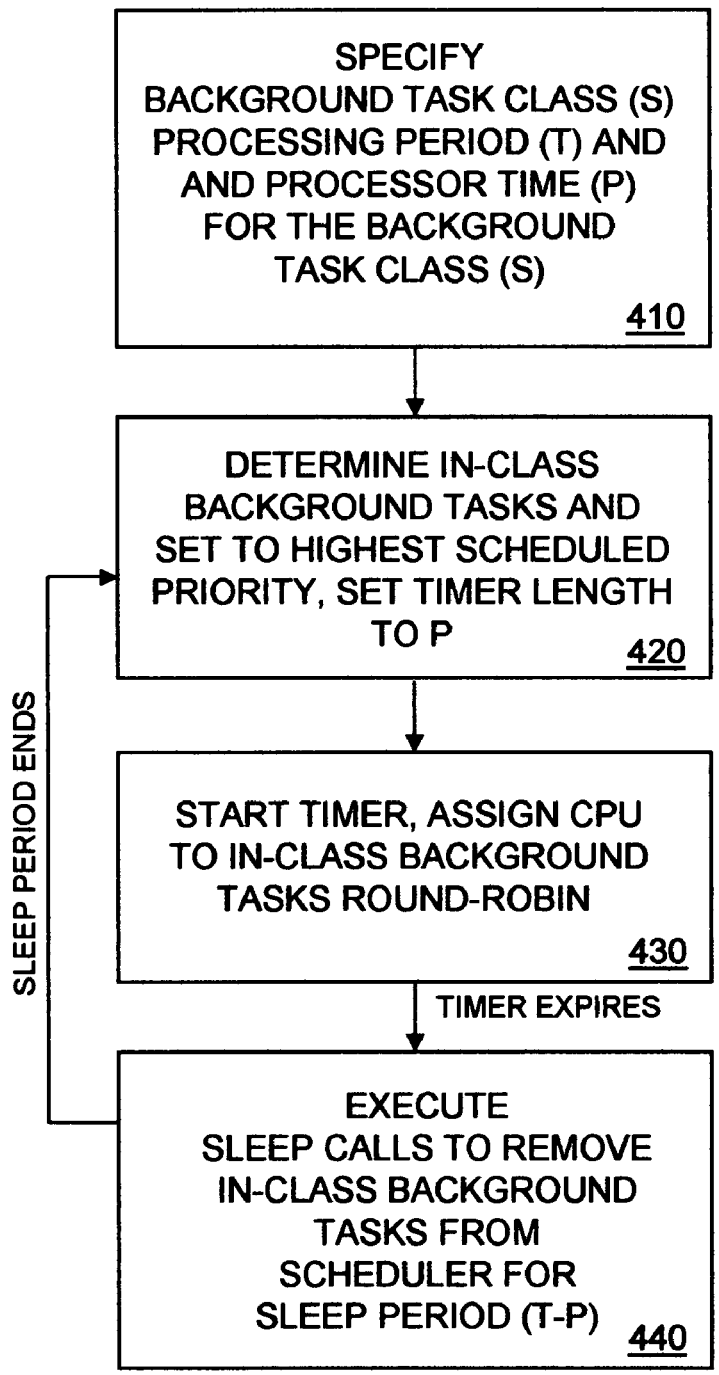
FIG. 4 shows a method for scheduling tasks in a MFP in another embodiment of the invention.

FIG. 4 shows a method for scheduling tasks in MFP 100 in another embodiment of the invention. In this embodiment, a scheduler supported in some known operating systems is modified to provide support for the scheduling methods and systems of the present invention. More particularly, the scheduler in some known operating systems schedules tasks based on strict priority and schedules tasks having the some priority round-robin. The embodiment illustrated in FIG. 4 adapts this scheduling framework to prevent starvation of designated background tasks while maintaining substantially seamless processing of active jobs. Generally speaking, this adaptation is accomplished by providing elevated priority assignments to the background tasks to be protected from starvation and removing these background tasks from the scheduler using timely executed sleep calls.

Initially, a background task class (S), a processing period (T) and a processor time (P) for the background task class (S) are defined on the operating system (410). For certain classes of background tasks, such as background print spooling, a known or presumed print spooling data rate may be used to determine an appropriate processor time (P). Current tasks within the background task class (S) are then set to the highest priority supported by the scheduler, while active job tasks are set to a lower priority, and the length of a timer is set to the processor time (P) (420). The scheduler then runs and the timer starts. As a result of the priority settings, the scheduler assigns the processor to current tasks within the background task class (S) round-robin for the processor time (P) (430). The timer then expires after the processor time (P) and the operating system executes one or more sleep calls that force the scheduler to remove the current tasks within the background task class (S) from servicing for a sleep period, which is the difference between the processing period (T) and the processor time (P) (440). As a result of this removal, the scheduler services the active job tasks at the lower priority for the duration of the processing period (T). When the sleep period ends, the flow reverts to Step 420, resulting in a repetitive cycle that implements the scheduling methods and systems of the present invention.

While the invention has been described in relation to an MFP, the invention may operate on other types of computing devices that perform task scheduling. It will therefore be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

What is claimed is:

1. A method for scheduling tasks on a printing device, comprising the steps of:
   configuring on the printing device a processing period;
   configuring on the printing device a background task class having a specified characteristic;
   statically allocating on the printing device a class processor time for the class within the processing period;
   assigning by the printing device background tasks having the specified characteristic to the class;
   dynamically allocating by the printing device to each of the background tasks a background task processor time within the class processor time;
   processing by the printing device the background tasks during their respective background task processor times; and
   processing by the printing device active job tasks during times within the processing period outside the class processor time.

2. The method of claim 1, wherein each background task processor time is dynamically adjusted by the printing device to remain equal in length to the class processor time divided by the number of background tasks.

3. The method of claim 1, further comprising the steps of:
   completing by the printing device one of the background tasks;
   deallocating by the printing device the background task processor time allocated to the completed background task; and
   proportionately increasing by the printing device the background task processor times of remaining background tasks assigned to the class.

4. The method of claim 1, further comprising the steps of:
   assigning by the printing device an additional background task having the specified characteristic to the class;
   allocating by the printing device a background task processor time to the additional background task; and
   proportionately decreasing by the printing device the task processor times of preexisting background tasks assigned to the class.

5. The method of claim 1, further comprising the steps of:
   configuring on the printing device a second background task class having a second specified characteristic;
   statically allocating on the printing device a second class processor time for the second class within the processing period;
   assigning by the printing device background tasks having the second specified characteristic to the second class;
   dynamically allocating by the printing device to each of the background tasks assigned to the second class a background task processor time within the second class processor time; and
   processing by the printing device the background tasks assigned to the second class during their respective background task processor times.

6. The method of claim 5, wherein each second class background task processor time is dynamically adjusted by the printing device to remain equal in length to the second class processor time divided by the number of background tasks assigned to the second class.

7. The method of claim 1, wherein the class processor time is contiguous within the processing period.

8. The method of claim 1, wherein the class processor time is intermittent within the processing period.

9. The method of claim 1, wherein the first processing step comprises the substeps of:
   setting the class to a higher priority than an active job task class;
   setting a length of a timer to the class processor time;
   setting a sleep period to a difference between the processing period and the class processor time;
   starting the timer; and
   processing the background tasks round-robin during their background task processor times until the timer expires;
   and wherein the second processing step comprises the substeps of:
   executing one or more sleep calls to remove the background tasks from servicing for the sleep period upon expiration of the timer; and
   processing the active job tasks for the duration of the processing period.

10. The method of claim 1, wherein the background tasks comprise print spooling tasks for non-active print jobs.

11. The method of claim 1, wherein the class processor time is determined using a print spooling data rate.

* * * * *